United States Patent
Oguma et al.

(10) Patent No.: US 9,606,696 B2
(45) Date of Patent: Mar. 28, 2017

(54) INFORMATION PROCESSING APPARATUS THAT DISPLAYS STATUS OF EXTERNAL APPARATUS IN STATUS MONITOR, AND DISPLAYING METHOD

(71) Applicant: KYOCERA Document Solutions Inc., Osaka (JP)

(72) Inventors: Takashi Oguma, Osaka (JP); Takehiko Asano, Osaka (JP); Yoshiyuki Taira, Osaka (JP)

(73) Assignee: Kyocera Document Solutions Inc. (JP)

(*) Notice: Subject to any disclaimer, the term of this patent is extended or adjusted under 35 U.S.C. 154(b) by 922 days.

(21) Appl. No.: 13/946,067

(22) Filed: Jul. 19, 2013

(65) Prior Publication Data
US 2014/0026092 A1    Jan. 23, 2014

(30) Foreign Application Priority Data
Jul. 20, 2012    (JP) .................................. 2012-161623

(51) Int. Cl.
*G06F 3/0481*    (2013.01)
*G06F 11/32*    (2006.01)
(Continued)

(52) U.S. Cl.
CPC .......... *G06F 3/0481* (2013.01); *G06F 3/1218* (2013.01); *G06F 3/1229* (2013.01);
(Continued)

(58) Field of Classification Search
CPC .... G06F 3/0481; G06F 3/1218; G06F 3/1229; G06F 3/1253; G06F 11/3013; G06F 11/3055; G06F 11/324
(Continued)

(56) References Cited

U.S. PATENT DOCUMENTS

| 6,917,437 B1 | 7/2005 | Myers et al. |
| 2005/0183030 A1* | 8/2005 | Bertram ................ G06F 3/0483 715/800 |

(Continued)

FOREIGN PATENT DOCUMENTS

| JP | 2001-075694 | 3/2001 |
| JP | 2008155649 A | 7/2008 |

OTHER PUBLICATIONS

Extended European Search Report and Opinion for App. No. EP 13177464.8, mailed Jul. 29, 2014, 6 pages.

*Primary Examiner* — Jennifer To
*Assistant Examiner* — John Repsher, III
(74) *Attorney, Agent, or Firm* — McDonnell Boehnen Hulbert & Berghoff LLP

(57) ABSTRACT

An information processing apparatus includes a processor, a communication unit, an input unit, a display unit, and a storage unit storing a program. The program causes the information processing apparatus to display i) a status of an external apparatus received via the communication unit in a status window of a status monitor displayed on the display unit, ii) a tab indicating a category of the status in a side portion of the status window, iii) a first icon in the tab indicating a change in the status, and iv) a second icon that, when selected, causes the information processing apparatus to switch between displaying a maximum size status window and a minimum size status window. The maximum size status window includes the tab selected via the input unit and a tab page of the selected tab, and the minimum size status window includes the selected tab but not the tab page of the selected tab.

14 Claims, 10 Drawing Sheets

(51) Int. Cl.
*G06F 11/30* (2006.01)
*G06F 3/12* (2006.01)

(52) U.S. Cl.
CPC ........ *G06F 11/3013* (2013.01); *G06F 11/324* (2013.01); *G06F 3/1253* (2013.01); *G06F 11/3055* (2013.01)

(58) Field of Classification Search
USPC ........................................................ 715/777
See application file for complete search history.

(56) References Cited

U.S. PATENT DOCUMENTS

| | | | |
|---|---|---|---|
| 2006/0173557 A1 | 8/2006 | Kisanuki | |
| 2010/0074633 A1* | 3/2010 | Kuwasaki | H04N 1/00222 399/8 |
| 2011/0235107 A1* | 9/2011 | Sakata | H04N 1/0035 358/1.15 |
| 2012/0044520 A1* | 2/2012 | Goddard | G06F 3/1207 358/1.15 |

\* cited by examiner

| ERROR CODE | TEXT DISPLAYED |
|---|---|
| ⋮ | ⋮ |
| 2053 | Waste-toner box is full |
| ⋮ | ⋮ |

INFORMATION PROCESSING APPARATUS THAT DISPLAYS STATUS OF EXTERNAL APPARATUS IN STATUS MONITOR, AND DISPLAYING METHOD

INCORPORATION BY REFERENCE

This application is based upon, and claims the benefit of priority from, corresponding Japanese Patent Application No. 2012-161623, filed in the Japan Patent Office on Jul. 20, 2012, the entire contents of which are incorporated herein by reference.

FIELD

The present disclosure relates to an information processing apparatus that displays a received status of an external apparatus in a status monitor, and a displaying method.

BACKGROUND

A typical information processing apparatus may display, for example, an "alarm setting" and a "repetition setting" in the form of text on respective tabs. The apparatus may further display on the tabs icons showing summaries of the settings, thus allowing a user to view summaries of the settings of other tab pages without having to select and display the other tab pages. A typical information processing apparatus may also display a status of an external apparatus in a dedicated status monitor window on a display unit, thus allowing a user to view the status of an external apparatus at any time. However, if both a tab and a tab page are displayed, the size of the display window must be increased. Hence, if the status monitor window is always displayed, display of a window for another task is hindered, thus decreasing task efficiency.

SUMMARY

The present disclosure relates to an information processing apparatus in which display of the window for the other task is not hindered even when the status of the external apparatus is always displayed in the status monitor window of the information processing apparatus. The disclosed information processing apparatus thus allows a user to easily view the status of the external apparatus.

An information processing apparatus according to an embodiment of the present disclosure includes a processor; a communication unit; an input unit; a display unit; and a storage unit storing a program. The program causes the information processing apparatus to display i) a status of an external apparatus received via the communication unit in a status window of a status monitor displayed on the display unit, ii) a tab indicating a category of the status in a side portion of the status window, iii) a first icon in the tab indicating a change in the status, and iv) a second icon that, when selected, causes the information processing apparatus to switch between displaying a maximum size status window and a minimum size status window. The maximum size status window includes the tab selected via the input unit and a tab page of the selected tab. The minimum size status window includes the selected tab but not the tab page of the selected tab.

A displaying method according to an embodiment of the present disclosure is carried out by an information processing apparatus that includes a communication unit, an input unit, and a display unit. The information processing apparatus displays i) a status of an external apparatus received via the communication unit in a status window of a status monitor displayed on the display unit, ii) a tab indicating a category of the status in a side portion of the status window, iii) a first icon in the tab indicating a change in the status, and iv) a second icon that, when selected, causes the information processing apparatus to switch between displaying a maximum size status window and a minimum size status window. The maximum size status window includes the tab selected via the input unit and a tab page of the selected tab. The minimum size status window includes the selected tab but not the tab page of the selected tab.

Additional features and advantages are described herein, and will be apparent from the following Detailed Description and figures.

DETAILED DESCRIPTION

Figure 1:
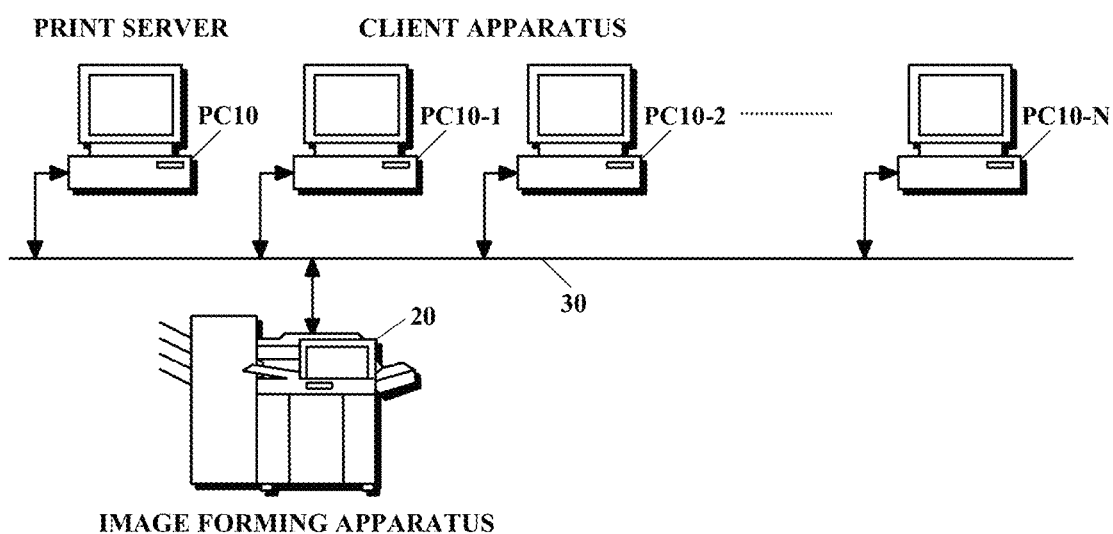
FIG. 1 is a schematic diagram illustrating an image forming system of the present disclosure.

FIG. 1 is a schematic diagram illustrating the configuration of an image forming system of the present disclosure. As shown in FIG. 1, the image forming system includes a print server (PC 10) used as a manager computer and a print server, n PCs 10-1 to 10-n used as a client apparatus, and an image forming apparatus 20, each of which are coupled to a network 30. The network is configured to enable two-way communication between the print server PC 10 and the image forming apparatus 20 and between the print server PC 10 and the client PCs 10-1 to 10-n.

Figure 2:
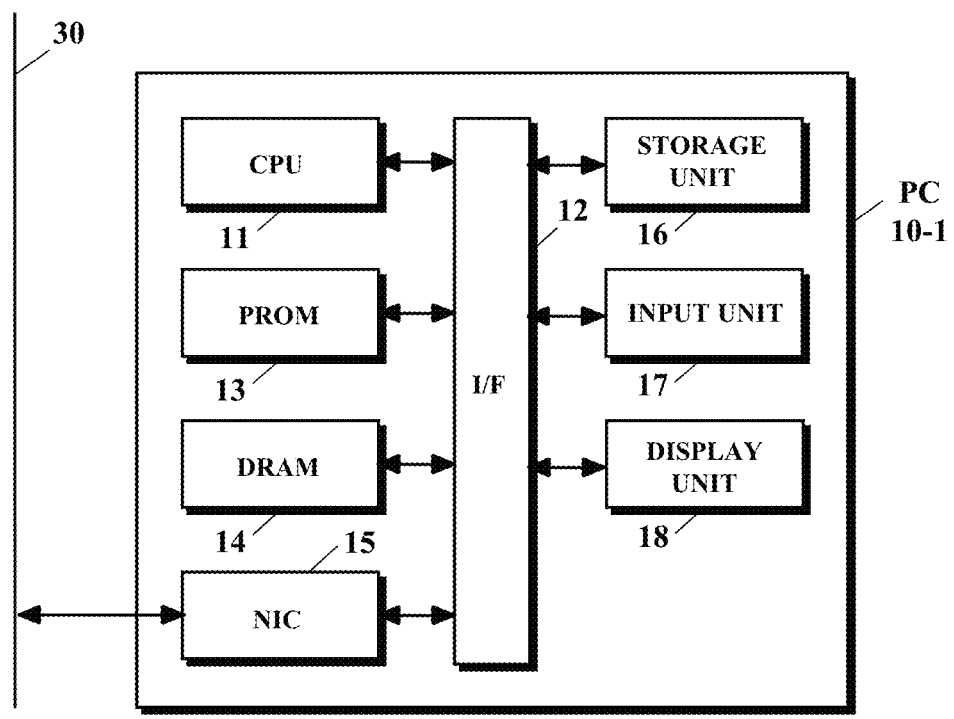
FIG. 2 is a block diagram illustrating the hardware configuration of a client apparatus of the image forming system.

FIG. 2 is a block diagram illustrating the hardware configuration of the client PC 10-1. As shown in FIG. 2, the client PC 10-1 includes a central processing unit (CPU) 11 coupled to a program read only memory (PROM) 3, a dynamic random access memory (DRAM) 14, a network interface card (NIC) 15, a storage unit 16, an input unit 17, and a display unit 18 via an interface 12. In FIG. 2, multiple types of interface are represented as a single functional block 12. The hardware configurations of the client PCs 10-2 to 10-n are similar to the hardware configuration of the client PC 10-1.

The PROM 13, which is, for example, a flash memory, stores a basic input/output system (BIOS). The DRAM 14 is used as the main memory. The network interface 15 is coupled to the network 30. The storage unit 16 stores an operating system (OS) and various drivers and applications that realize the functions of the manager computer and the print server. The applications include a status monitor. The input unit includes, for example, a keyboard and a pointing device.

The image forming apparatus 20 has a printing function and includes a print engine, a paper feed unit, a paper transport unit, and a paper output unit. Page description language (PDL) data received from the print server PC 10 is developed into bitmap data, and using this data, a laser beam is modulated and an electrostatic latent image is formed on a photoconductor drum. The electrostatic latent image is developed with toner, a toner image is transferred to and fixed on paper, and the paper is output.

Figure 3:
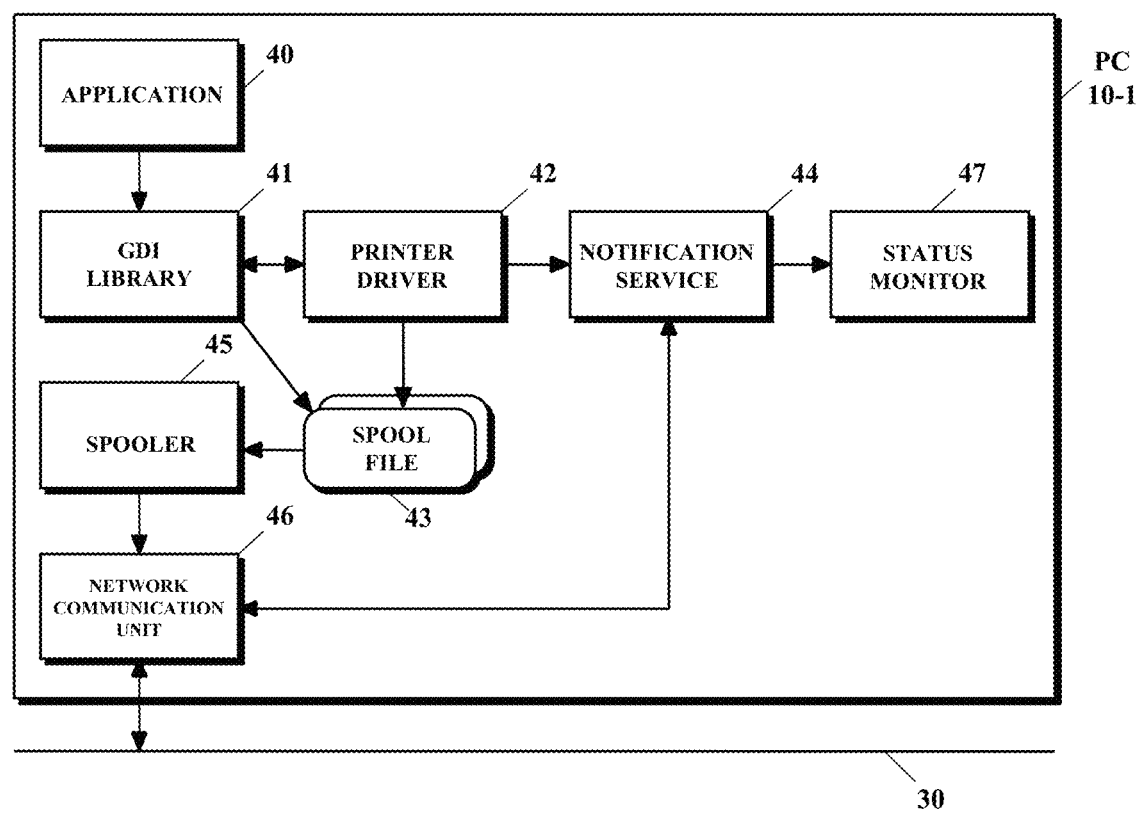
FIG. 3 is a block diagram illustrating the functional configuration of the client apparatus.

FIG. 3 is a block diagram illustrating the functional configuration of the client PC 10-1. The client PC 10-1 illustrated in the figure is also representative of the client PCs 10-2 to 10-n. The configurations of the PCs 10-2 to 10-n are similar to the configuration of the PC 10-1. In the description below, the OS is assumed to be Windows®.

An application 40 converts document data into print job data by calling a function within a Graphic Device Interface (GDI) library 41 of the OS. A GDI function both i) converts GDI drawing data into PDL data that can be interpreted by the image forming apparatus 20 and ii) writes the data into a spool file 43, via a printer driver 42.

The process for converting document data into print job data for a single job ends when the application 40 calls the EndDoc function within the GDI library 41. In response to the application calling this function, the printer driver 42 generates a globally unique identifier (GUID) and writes the GUID into the spool file 43 as a job ID. The printer driver 42, by providing the job ID to a notification service 44, requests registration of an event subscription. The notification service 44, which is a resident program, operates in the background so as to always receive input.

The notification service 44 transmits the job ID received from the printer driver 42, together with the IP address of the client PC 10-1, to the print server PC 10 via a network communication unit 46 and the network 30. The print server PC 10, upon receipt of the job ID and IP address, registers these as a single record in the WS-Eventing event subscription table.

When the writing of data to the spool file 43 is complete, a spooler 45 puts the identifier of the data in a queue. The spooler 45, every time an identifier is taken out from the head of the queue, supplies a spool file to the print server PC 10 via the network communication unit 46. The print server PC 10 sequentially spools received spool files and transmits the spool files to the image forming apparatus 20. The image forming apparatus 20 develops received data into bitmap data and supplies the bitmap data to a print engine. An image is formed on paper and the paper is output via control of a paper feed and output mechanism.

When an error is generated in the print engine, the paper feed and output mechanism, and the like, or when a job processing status changes, the image forming apparatus 20 transmits the content of the event as a status change event of the apparatus to the print server PC 10 via the network 30. The content of the event includes the status of the apparatus or print job and also includes a job ID in the case that the event relates to a print job.

When the content of the event is a print job status, the print server PC 10 reads a record including the job ID from the subscription table described above, and sets the address of a destination PC as the IP address included in the record. When the content of the event is an apparatus status, the print server PC 10 sets the addresses of destination PCs as the IP addresses registered in the subscription table, and transmits the content of the event to the notification services 44 of the client PCs via the network 30.

FIGS. 4A, 4B, 5A, and 5B are diagrams respectively illustrating the configurations of first, second, third, and fourth maximum size status windows 50A, 50B, 50C, and 50D displayed on the display unit 18 by a status monitor 47.

Referring to FIGS. 4A, 4B, 5A, and 5B, to display statuses corresponding to the respective categories of statuses of the image forming apparatus 20 in the status windows 50A, 50B, 50C, and 50D, tabs 51 to 54 respectively corresponding to these categories are displayed in a side portion of the respective status window—e.g., in an upper portion 50a within each of the status windows 50A, 50B, 50C, and 50D. For example, when the tab 51 is selected via operation of the input unit 17, the details of the status are displayed in the tab page 55 of the selected tab. A size switching icon 58 is displayed in the right end portion of the upper portion 50a of each of the first, second, third, and fourth status windows 50A, 50B, 50C, and 50D.

Figure 4A:
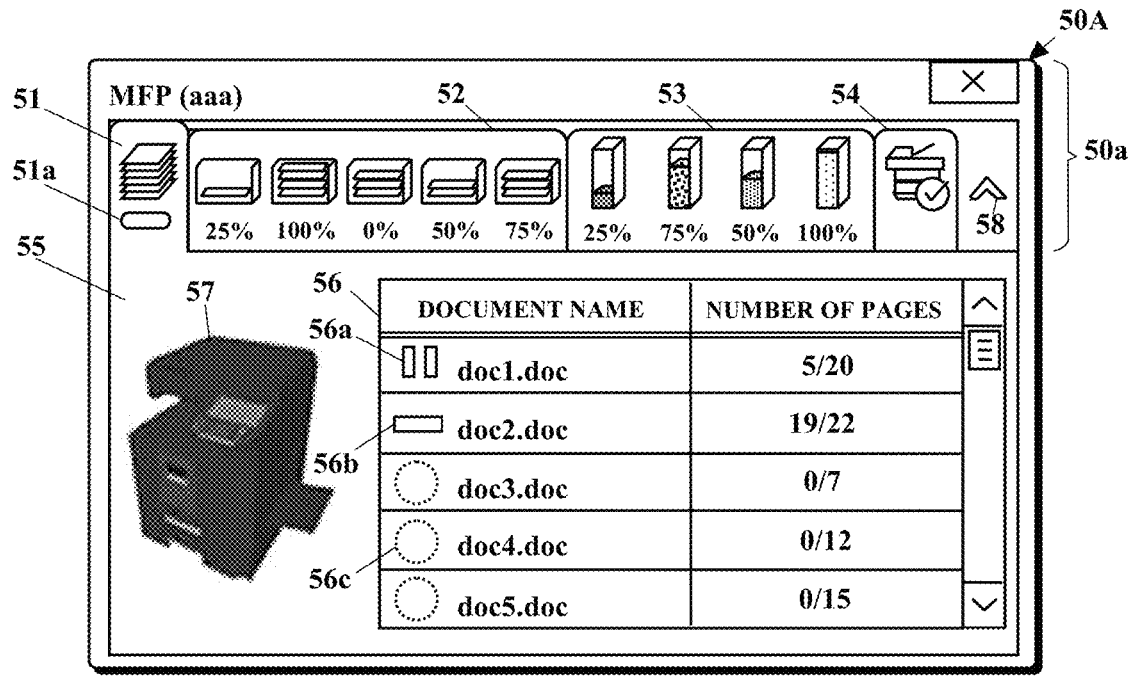
FIG. 4A is a schematic diagram illustrating the configuration of a first maximum size status window illustrated by a status monitor.

FIG. 4A illustrates a state in which the tab 51 has been selected, and a print information table 56 and an external view image 57 of the image forming apparatus 20 are displayed in the tab page 55 of the tab 51. The print information table 56 shows the document name and the number of pages of each print job submitted to the image forming apparatus 20 by a user via the client PC 10-1 and the print server PC 10.

Icons indicating the statuses of print jobs are displayed on the left side of the document names. An icon 56a indicates that printing is paused, an icon 56b indicates that printing is in progress, and an icon 56c indicates that printing is pending. The number of pages is displayed in the form of (current number of printed pages)/(total number of pages to be printed). For each print job, when a status (including the number of printed pages) changes, a notification of the event is transmitted from the image forming apparatus 20 to the notification service 44 of the client PC 10-1 via the print server PC 10. An external view image 57 illustrates an external view of an image forming apparatus in which a print job is being executed.

An icon indicating the status of a print job and a print status bar 51a indicating a summary of the print job are displayed in the tab 51. For example, a green print status bar 51a is displayed when a job is printing, a yellow print status bar 51a is displayed when no jobs are printing because printing is paused or pending, and a red print status bar 51a is displayed when printing is stopped due to an error.

Figure 4B:
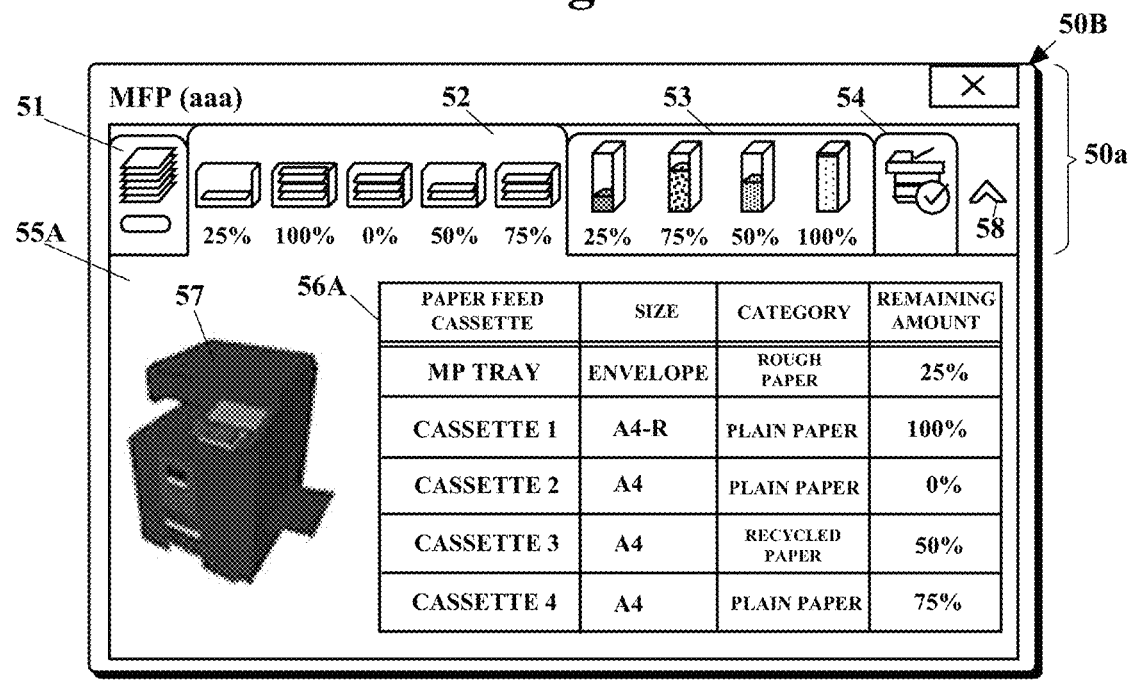
FIG. 4B is a schematic diagram illustrating the configuration of a second maximum size status window.

FIG. 4B illustrates a state in which the tab 52 has been selected, and the paper feed cassette information table 56A and the external view image 57 are displayed in a tab page

55A. The paper feed cassette information table 56A shows the size, category, and remaining amount (%) of paper for each paper feed cassette. The paper feed cassettes include a multipurpose tray (MP tray) and cassettes 1 to 4. In the image forming apparatus 20, the remaining amount of paper is detected by, for example, a sensor (not illustrated) and every time the amount changes by 25%, a notification is transmitted from the image forming apparatus 20 to the notification service 44 of the client PC 10-1 via the print server PC 10.

In accordance with the paper feed cassette information table 56A, the icons of the MP tray and the paper feed cassettes 1 to 4 are sequentially displayed from the left side to the right side in the tab 52, and the remaining amounts (%) of paper in the paper feed cassettes are displayed below the corresponding icons.

Figure 5A:
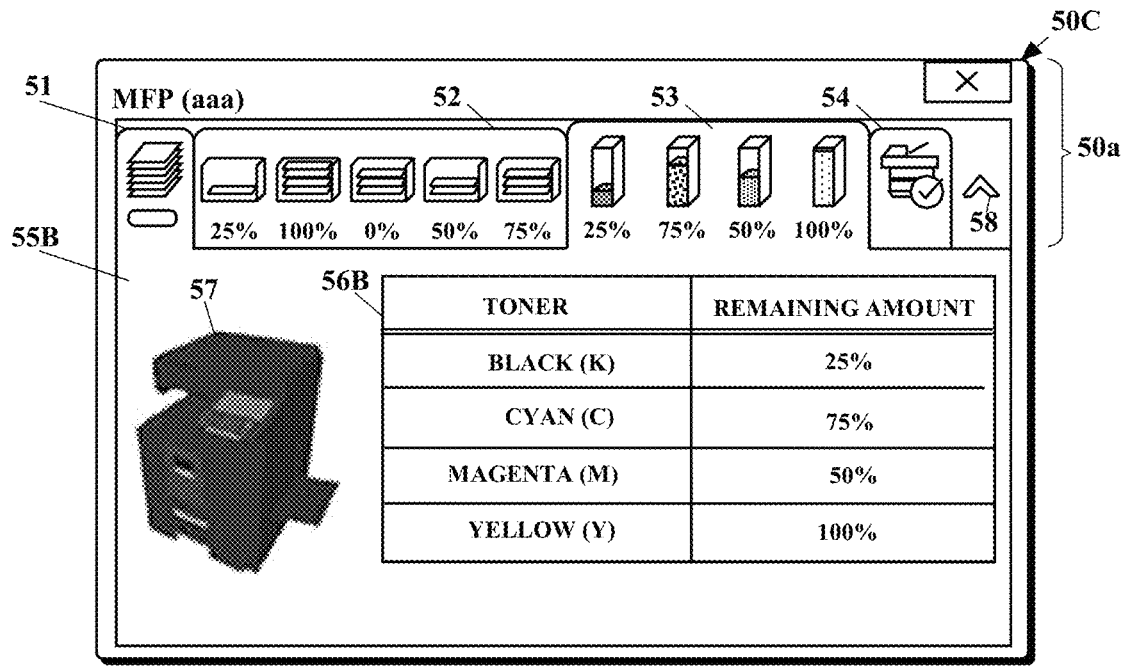
FIG. 5A is a schematic diagram illustrating the configuration of a third maximum size status window.

FIG. 5A illustrates a state in which the tab 53 has been selected and a toner information table 56B is displayed in a tab page 55B. The remaining amounts (%) of black (K), cyan (C), magenta (M) and yellow (Y) toners are shown in the toner information table 56B. In the image forming apparatus 20, the remaining amount of toner is detected by, for example, a sensor (not illustrated) and every time the amount changes by 25%, a notification is transmitted from the image forming apparatus 20 to the notification service 44 of the client PC 10-1 via the print server PC 10.

The icons corresponding to the respective K, C, M, and Y toners are displayed in the tab 53, the colors and the levels of the remaining amounts of the toners are displayed as images in the respective icons, and the remaining amounts (%) of the toners are displayed below the corresponding icons.

Figure 5B:
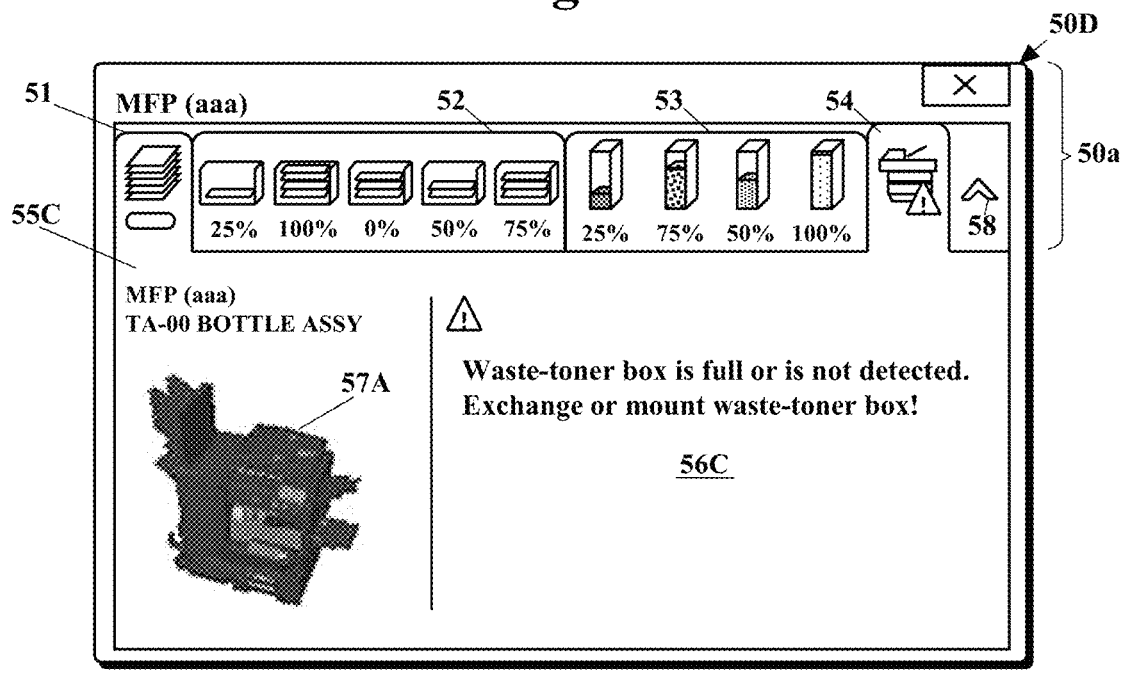
FIG. 5B is a schematic diagram illustrating the configuration of a fourth maximum size status window.

FIG. 5B illustrates a state in which the tab 54 has been selected and the apparatus errors and resolutions are displayed in text in an error display region 56C of a tab page 55C. For example, a message stating that a waste-toner box is full or was not detected by the printing system and an instruction to exchange or mount a waste-toner box are displayed. Every time an error of the apparatus is generated, a notification of the event is transmitted from the image forming apparatus 20 to the notification service 44 of the client PC 10-1 via the print server PC 10.

In the tab page 55C, an internal image 57A of the image forming apparatus 20 is also displayed. The internal image 57A illustrates the position of the waste-toner box within the image forming apparatus 20. The model number [MFP (aaa)] of the image forming apparatus 20 and the model number (TA-00) of the waste-toner box are displayed above the internal image 57A.

Figure 6:
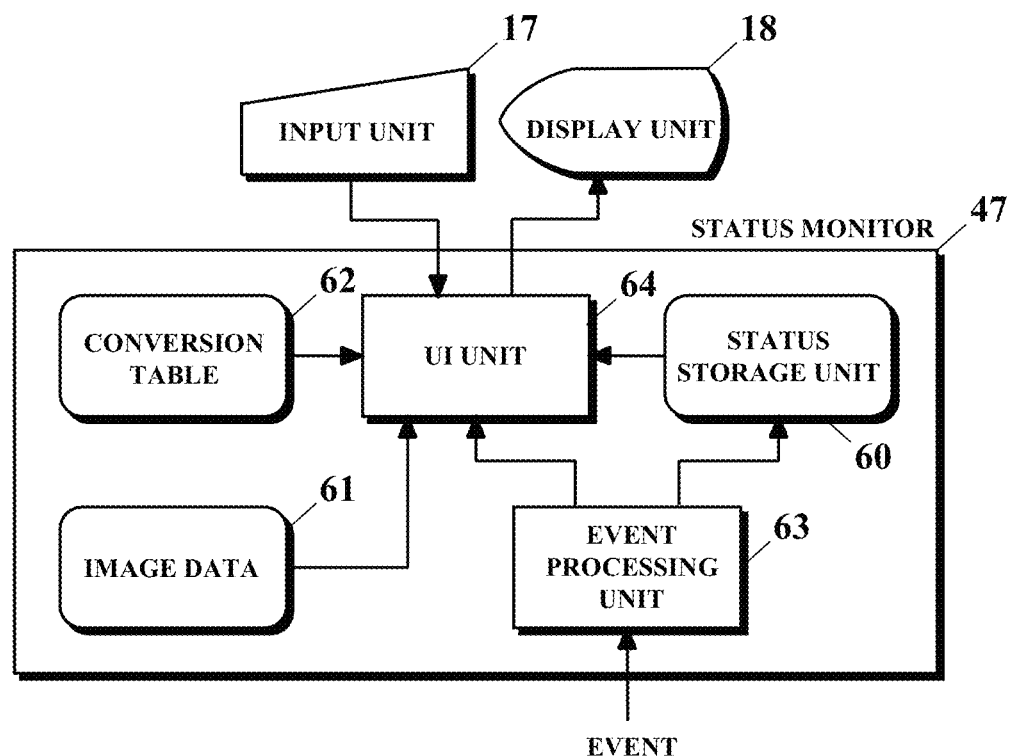
FIG. 6 is a block diagram illustrating the functional configuration of the status monitor.

FIG. 6 is a block diagram illustrating the functional configuration of the status monitor 47. As shown in FIG. 6, the status monitor 47 includes a status storage unit 60 for storing status information to be displayed in the status windows 50A, 50B, 50C, and 50D, image data 61 to be displayed in the tabs and the tab pages 55, 55A, 55B, and 55C, and a conversion table 62 for converting error codes into text. The status monitor 47 further includes an event processing unit 63 and a user interface (UI) unit 64.

Figures 7A, 7B:
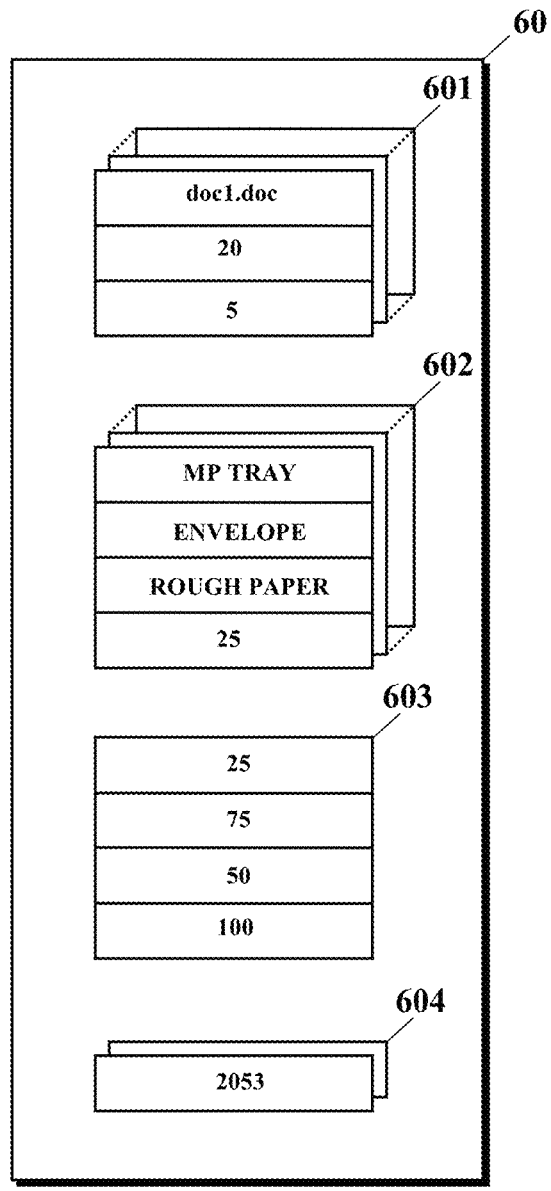
FIG. 7A is a schematic diagram illustrating data structures in a status storage unit of the status monitor.
FIG. 7B is a schematic diagram illustrating the configuration of a conversion table of the status monitor.

FIG. 7A is a schematic diagram illustrating data structures in the status storage unit 60 of the status monitor 47. As shown, the status storage unit 60 includes data 601 to be displayed in the print information table 56 illustrated in FIG. 4A, data 602 to be displayed in the paper feed cassette information table 56A illustrated in FIG. 4B, data 603 to be displayed in the toner information table 56B illustrated in FIG. 5A, and error codes 604 corresponding to the text to be displayed in the error display region 56C illustrated in FIG. 5B. FIG. 7B is a schematic diagram illustrating the configuration of the conversion table 62 for converting the error codes 604 into text.

Figure 8:
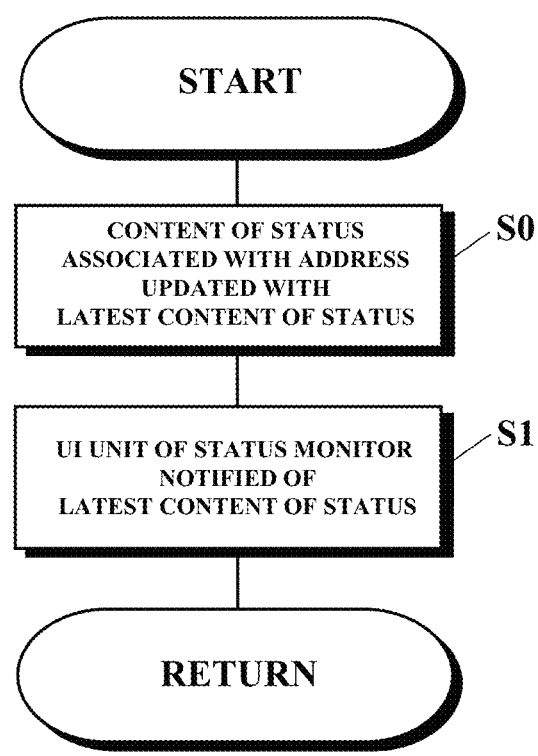
FIG. 8 is a flowchart illustrating a process performed by an event processing unit of the status monitor.

FIG. 8 is a flowchart illustrating a process performed by the event processing unit 63 of the status monitor 47. This process is started in response to transmission of an event notification from the network communication unit 46 illustrated in FIG. 3. The content of an event includes an address (status identifier) within the status storage unit 60 and the content of a status (the remaining amount (%) of toner or paper, an error code, and the like). In step S0, the content of a status associated with the address is updated with the latest content of the status. In step S1, the UI unit 64 of the status monitor 47 is notified of the latest content of the status.

Figure 9:
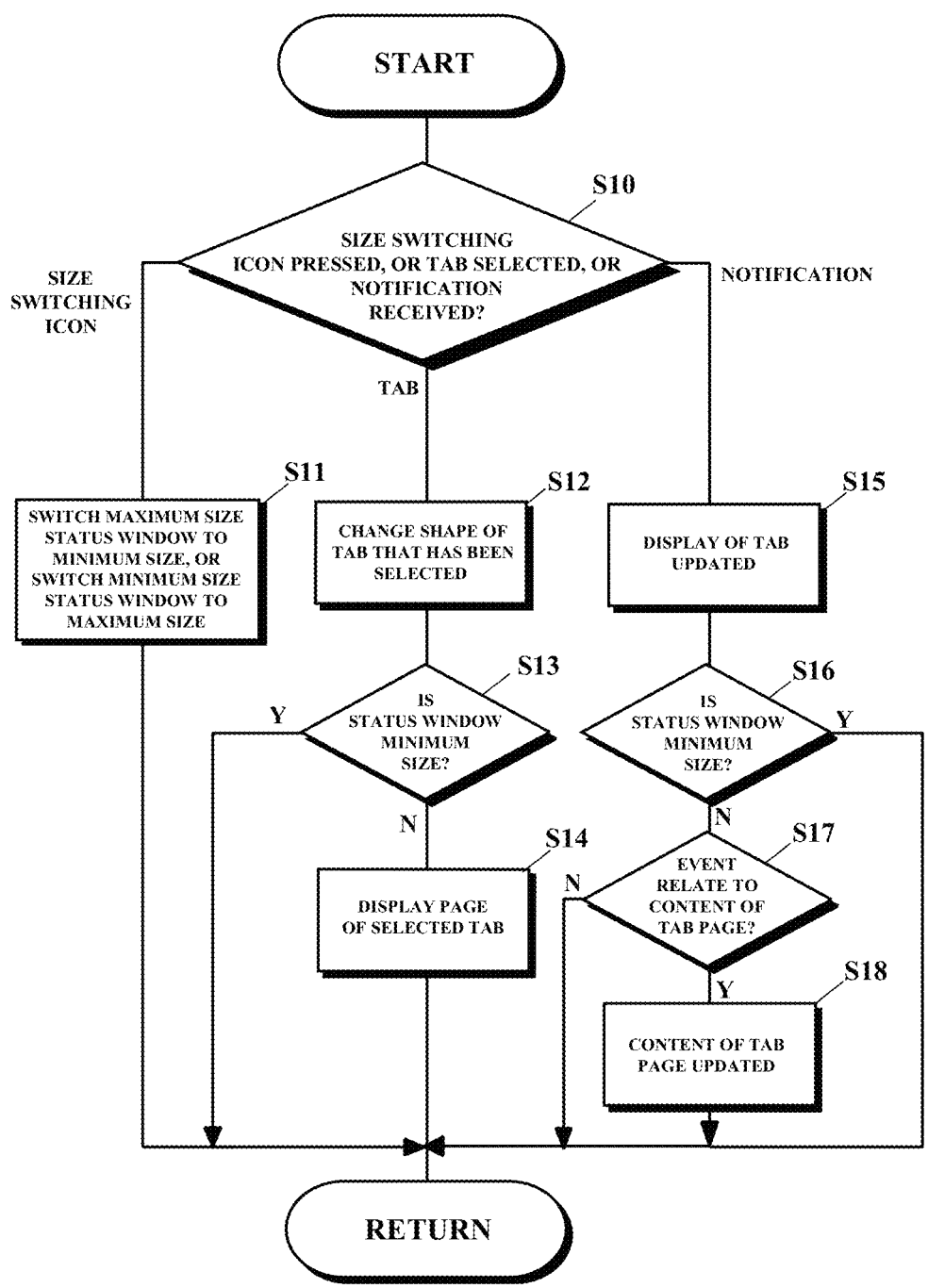
FIG. 9 is a flowchart illustrating a process performed by a UI unit of the status monitor.
Figure 10A:
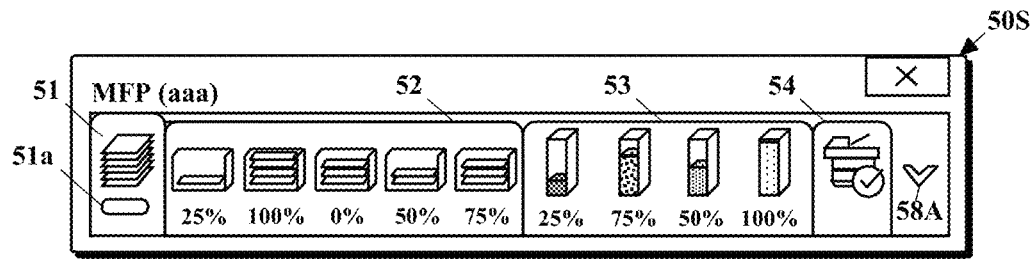
FIG. 10A is a schematic diagram illustrating the configuration of a first minimum size status window.
Figure 10B:
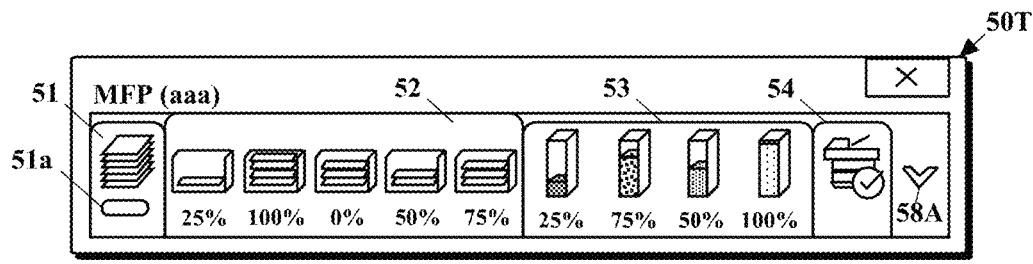
FIG. 10B is a schematic diagram illustrating the configuration of a second minimum size status window.
Figure 10C:
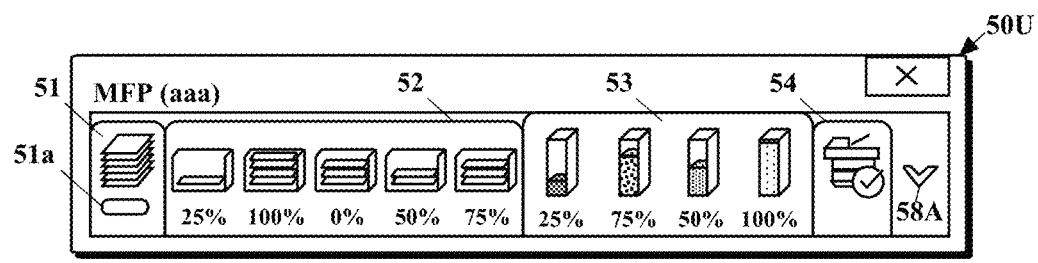
FIG. 10C is a schematic diagram illustrating the configuration of a third minimum size status window.
Figure 10D:
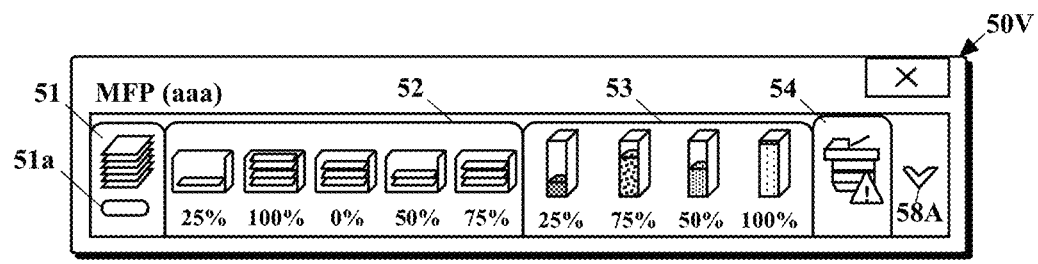
FIG. 10D is a schematic diagram illustrating the configuration of a fourth minimum size status window.

FIG. 9 is a flowchart illustrating a process performed by the UI unit 64 of the status monitor 47. The process performed by the UI unit 64 is started in response to a user selecting a tab via the input unit 17 or has pressing the size switching icon 58 or in response to receiving a notification from the event processing unit 63.

In step S10, the flow proceeds to step S11 when the size switching icon 58 has been pressed, to step S12 when a tab has been selected, and to step S15 when a notification has been received from the event processing unit 63.

In step S11, when the size switching icon 58 has been pressed, the first, second, third, and fourth maximum size status windows 50A, 50B, 50C, and 50D are switched so that first, second, third, and fourth minimum size status windows 50S, 50T, 50U, and 50V respectively illustrated in FIG. 10A, FIG. 10B, FIG. 10C, and FIG. 10D are displayed, and the process of FIG. 9 ends. Further, when a size switching icon 58A is pressed, the first, second, third, and fourth minimum size status windows 50S, 50T, 50U, and 50V are switched so that the first, second, third, and fourth maximum size status windows 50A, 50B, 50C, and 50D are displayed, and the process of step FIG. 9 ends.

In step S12, the shape of a tab that has been selected is changed so that the selected tab is recognizable by a user. For example, when the tab 51 has been selected in FIG. 4A, a boundary line between the tab 51 and the tab page 55 may be removed and the height of the tab 51 may be enlarged as compared to the non-selected tabs. Further, a previously-selected tab is changed to a non-selected state shape.

In step S13, the flow proceeds to step S14 if the displayed status window is not the minimum size, and the process of FIG. 9 ends when the displayed status window is the minimum size.

In step S14, the page of the selected tab is displayed on the basis of data in the status storage unit 60, and the content of an image file including an icon file in the image data 61 is displayed. When the corresponding data in the status storage unit 60 is a code, the code is converted into text with reference to the conversion table 62 and the text is displayed in the tab page. The process of FIG. 9 then ends.

In Step S15, when the content of the event regards the displayed content of the tab, the display of the tab is updated irrespective of whether or not the tab has been selected.

In step S16, the flow proceeds to step S17 if the displayed status window is not the minimum size, and the process of FIG. 9 ends when the displayed status window is the minimum size.

In steps S17 and S18, when the event relates to the content of the tab page being displayed, then the content of the tab page is updated. When the content of the event regards the display of the icon, the icon is updated by the image data 61. The event and the icon are associated with each other as a result of the address (status identifier) of the event being included in the name of the icon file. When an error code is included in the event, the error code is converted into text with reference to the conversion table 62 and the content of the tab page is updated.

Accordingly, a plurality of icons are displayed in each of the tabs 52 and 53 corresponding to the respective categories of statuses of the image forming apparatus 20, and the corresponding attribute value of a status is displayed in the form of text under each of the icons. Further, the icon and attribute value in the corresponding tab are updated in accordance with a status change, irrespective of whether the corresponding tab has been selected. As a result, the statuses of the image forming apparatus 20 are easily viewable in real time even when the tab page of a selected tab is not being displayed.

Further, even when the status window is the minimum size, the statuses of the image forming apparatus 20 are easily viewable since the tabs 52 and 53 are always displayed, and display of other task windows is not hindered even when the statuses of the image forming apparatus 20 are always displayed in the status window of an information processing apparatus.

Moreover, in FIG. 4B, even when the tab page of the tab 52 is not displayed by selecting the tab 52, the remaining amount, as a percentage, of paper in each of the MP tray and the paper feed cassettes 1 to 4 is easily viewable.

Additionally, in FIG. 5A, even when the tab page of the tab 53 is not displayed by selecting the tab 53, the remaining amount, as a percentage, of toner in each of the toner containers of CMYK colors is easily viewable.

While various aspects and embodiments have been disclosed herein, other aspects and embodiments are possible. Other designs may be used in which the above-described components are each present.

Although the top portion of the status monitor window in the embodiment described above displays the tabs and the size switching icon, the bottom portion, right side portion, or left side portion of the status monitor window may display the tabs and size switching icons.

In FIG. 1, the image forming apparatus 20 may be locally coupled to the print server PC 10 or the PC 10-1.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming system comprising:
   an information processing apparatus;
   a print server; and
   an image forming apparatus, all of which are coupled to a network,
   the information processing apparatus comprising:
      a processor;
      a communication unit;
      an input unit;
      a display unit; and
      a storage unit storing a program,
   wherein the information processing apparatus i) converts drawing data into Page Description Language data that can be interpreted by the image forming apparatus, ii) generates a globally unique identifier (GUID) as a job ID, and iii) transmits the Page Description Language data as a print job and the job ID, together with an IP address of the information processing apparatus, to the print server via the communication unit and the network,
   wherein the print server i) registers the job ID and the IP address as a record in an event table, and ii) transmits the Page Description Language data to the image forming apparatus via the network,
   wherein the image forming apparatus i) develops the Page Description Language data into bitmap data, ii) supplies the bitmap data to a print engine, and iii) transmits an event to the print server via the network,
   wherein the event includes at least one of a status change of the print job and a status change of the image forming apparatus, and the event of the status change of the print job includes the job ID,
   wherein the print server i) when the event is the status change of the print job, sets the IP address as a destination in the record registered in the event table, the record including the job ID in the event, ii) when the event is the status change of the image forming apparatus, sets all the IP addresses as the destinations registered in the event table, and iii) transmits the event to the communication unit of the information processing apparatus including the IP address as the destination via the network,
   wherein the program causes the processor to display i) the status change received via the communication unit and the network in a status window of a status monitor displayed on the display unit, and ii) a tab in a side portion of the status window indicating a category of the status change,
   wherein the program, when the event is the status change of the image forming apparatus, further causes the processor to display
   i) a first icon in the tab indicating the status change of the image forming apparatus including at least one of a paper within a paper feed cassette and a toner within a toner container, ii) a detail of the status change of the image forming apparatus in a tab page of the tab selected via the input unit,
   wherein the program, when the event is the status change of the print job, further causes the processor to display
   i) a print status bar indicating the status change of the print job including that a printing is at least one of progress, paused, pending, and stopped, and ii) the detail of the status change of the image forming apparatus in a tab page of the tab selected via the input unit,
   wherein the program further causes the processor to display a second icon that, when selected, causes the processor to switch between displaying a maximum size status window and a minimum size status window,
   wherein the maximum size status window includes a tab selected via the input unit and the tab page of the selected tab, and
   wherein the minimum size status window includes the selected tab but not the tab page of the selected tab.

2. The information processing apparatus according to claim 1, wherein the program further causes the information processing apparatus to:
   display in the tab an attribute value of the status corresponding to the first icon, and
   update the first icon and the attribute value in accordance with the status change irrespective of whether the tab has been selected via the input unit.

3. The information processing apparatus according to claim 2, wherein the attribute value of the status includes a remaining amount of the paper in the paper feed cassette.

4. The information processing apparatus according to claim 2, wherein the attribute value of the status includes a remaining amount of the toner in the toner container.

5. The information processing apparatus according to claim 1, wherein the print status bar comprises a green print status bar when the printing is progressing.

6. The information processing apparatus according to claim 1, wherein the print status bar comprises a yellow print status bar when the printing is paused or pending.

7. The information processing apparatus according to claim 1, wherein the print status bar comprises a red print status bar when the printing is stopped due to an error.

8. A displaying method performed by an image forming system comprising an information processing apparatus, a print server, and an image forming apparatus, all of which are coupled to a network, the information processing apparatus comprising a communication unit, an input unit, and a display unit, the displaying method comprising:
via the information processing apparatus,
converting drawing data into Page Description Language data that can be interpreted by the image forming apparatus,
generating a globally unique identifier (GUID) as a job ID, and
transmitting the Page Description Language data as a print job and the job ID, together with an IP address of the information processing apparatus, to the print server via the communication unit and the network,
via the print server,
registering the job ID and the IP address as a record in an event table, and
transmitting the Page Description Language data to the image forming apparatus via the network,
via the image forming apparatus,
developing the Page Description Language data into bitmap data,
supplying the bitmap data to a print engine, and
transmitting an event to the print server via the network, wherein the event includes at least one of a status change of the print job and a status change of the image forming apparatus, and the event of the status change of the print job includes the job ID,
via the print server,
setting, when the event is the status change of the print job, the IP address as a destination in the record registered in the event table, the record including the job ID in the event,
setting, when the event is the status change of the image forming apparatus, all the IP addresses as the destinations registered in the event table, and
transmitting the event to the communication unit of the information processing apparatus including the IP address as the destination via the network,
via the information processing apparatus,
displaying the status change received via the communication unit and the network in a status window of a status monitor displayed on the display unit;
displaying a tab indicating a category of the status change in a side portion within the status window;
displaying, when the event is the status change of the image forming apparatus, i) a first icon in the tab indicating a change in the status change of the image forming apparatus including at least one of a paper within a paper feed cassette and a toner within a toner container, and ii) a detail of the status change of the image forming apparatus in a tab page of the tab selected via the input unit,
displaying, when the event is the status change of the print job, i) a print status bar indicating the status change of the print job including that a printing is at least one of progress, paused, pending, and stopped, and ii) the detail of the status change of the image forming apparatus in a tab page of the tab selected via the input unit, and
displaying a second icon that, when selected, causes the information processing apparatus to switch between displaying a maximum size status window and a minimum size status window,
wherein the maximum size status window includes a tab selected via the input unit and the tab page of the selected tab, and
wherein the minimum size status window includes the selected tab but not the tab page of the selected tab.

9. The displaying method according to claim 8, further comprising:
displaying in the tab an attribute value of the status corresponding to the first icon; and
updating the first icon and the attribute value in accordance with the status change irrespective of whether the tab has been selected via the input unit.

10. The displaying method according to claim 8, wherein the attribute value of the status includes a remaining amount of the paper in the paper feed cassette.

11. The displaying method according to claim 8, wherein the attribute value of the status is a remaining amount of the toner in the toner container.

12. The displaying method according to claim 8, wherein the print status bar comprises a green print status bar when the printing is progressing.

13. The displaying method according to claim 8, wherein the print status bar comprises a yellow print status bar when the printing is paused or pending.

14. The displaying method according to claim 8, wherein the print status bar comprises a red print status bar when the printing is stopped due to an error.

* * * * *